United States Patent
Tsukamoto

(10) Patent No.: US 6,219,188 B1
(45) Date of Patent: Apr. 17, 2001

(54) OBSERVATION OPTICAL SYSTEM

(75) Inventor: Seitoku Tsukamoto, deceased, late of Yokohama (JP), by Mayumi Tsukamoto, legal representative

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/251,810

(22) Filed: Feb. 17, 1999

(30) Foreign Application Priority Data

Feb. 26, 1998 (JP) .................................................. 10-062338

(51) Int. Cl.$^7$ ...................................................... G02B 27/14
(52) U.S. Cl. ........................... 359/629; 359/640; 359/631; 345/7; 345/8
(58) Field of Search .................................. 359/640, 630, 359/631, 633, 629; 345/7, 8

(56) References Cited

U.S. PATENT DOCUMENTS

| | | | |
|---|---|---|---|
| 4,087,159 | * 5/1978 | Ulrich ......................... 350/96.12 |
| 5,216,551 | * 6/1993 | Fujii ............................ 359/884 |
| 5,331,333 | * 7/1994 | Tagawa et al. ................. 345/7 |
| 5,760,931 | * 6/1998 | Saburi et al. .................. 359/13 |
| 5,862,163 | * 1/1999 | Umezu et al. ................. 372/21 |
| 5,923,477 | * 7/1999 | Togino ........................ 359/631 |

FOREIGN PATENT DOCUMENTS 1-134401  5/1989 (JP).
5-127004  5/1993 (JP).

* cited by examiner

*Primary Examiner*—Georgia Epps
*Assistant Examiner*—Tim Thompson
(74) *Attorney, Agent, or Firm*—Robin Blecker & Daley

(57) ABSTRACT

An observation optical system includes a display unit, and a half mirror for guiding display information in the visible region, displayed on the display unit, to the eye of an observer. In this system, the half mirror is made up of a plurality of metal films and a plurality of dielectric films. The display information on the display unit is reflected by the half mirror to allow the observer to observe the information in a good optical performance condition. At the same time, a scenery image beam is transmitted through the half mirror to allow the observer to observe the scenery image in a good optical performance condition. A method of manufacturing the half mirror is also disclosed.

13 Claims, 2 Drawing Sheets

OBSERVATION OPTICAL SYSTEM

BACKGROUND OF THE INVENTION

1. Field of the Invention

The present invention relates to an observation system having a half mirror suited to a photographing apparatus such as a head mounted display or video camera which is designed to observe both video information, e.g., a liquid crystal display image, displayed on a display means and scenery image information within the same visual field, and a method of manufacturing the half mirror.

2. Description of the Related Art

A half mirror for splitting a light beam into a plurality of beams has been used in a conventional observation system for simultaneously observing pieces of image information, displayed in different directions, within the same visual field. For example, the optical system of an observation system mounted on a photographing apparatus such as a head mounted display or a video camera, which is designed to observe both image information, e.g., a liquid crystal display image, displayed on a display means and scenery image information within the same visual field, includes a half mirror for reflecting a liquid crystal display image toward the eyes of the observer and transmitting an external scenery image therethrough. As such a half mirror, for example, a dielectric multilayer film obtained by alternately stacking high-refractive-index films and low-refractive-index films, each consisting of a dielectric material, or a metal half mirror formed by sandwiching a metal film between dielectric films is often used.

According to conventional techniques of manufacturing half mirrors made of dielectric multilayer films or metal films, a large number of films are required for a dielectric multilayer film to obtain a relatively high reflectance in the visible region. In general, as the number of films to be formed increases, it becomes more difficult to manufacture a half mirror. In addition, the manufacturing cost increases, and the deflection characteristics of the dielectric multilayer film and the flatness of the spectral distribution deteriorate.

When a metal film is to be used, the deflection characteristics and the flatness of the spectral distribution are relatively good, but the film undesirably absorbs light. As a result, the optical characteristics of light amount splitting between transmitted light and reflected light deteriorate.

With the use of the conventional half mirror surface manufacturing techniques, it is difficult to obtain a half mirror that can satisfy both the requirements for optical characteristics and the manufacturing method.

SUMMARY OF THE INVENTION

It is an object of the present invention to provide an observation system having a half mirror which exhibits a flat spectral distribution in a wide visible region, has excellent optical characteristics with a small light absorption, and allows an easy manufacturing process, and a method of manufacturing the half mirror.

An observation system having a half mirror according to the present invention is (1—1) an observation system for observing video information in the visible region which is displayed on a display means by guiding the information to an eyeball of an observer using an observation optical system having a half mirror, characterized in that the half mirror is made up of a plurality of metal films and a plurality of dielectric films.

(1—1—1) The plurality of metal films are made of chromium and silver.

(1-1-2) The thickness of the chromium film falls within the range of 0.1 to 10 nm.

(1-2-3) A material for the dielectric film is one member selected from the group consisting of SiO, $SiO_2$, $MgF_2$, $Al_2O_3$, $ZrO_2$, $TiO_2$, $Ta_2O_5$, ZnS, and mixtures thereof.

(1-2-4) The observation optical system includes an optical element made of a prism member and a see-through prism member. The optical element has an incident surface on which a light beam from the display means is incident, a front surface which partly uses a total reflection surface for the light beam from the incident surface, and a reflecting surface for reflecting the light beam toward the front surface side. The prism member has an incident surface on which a light beam bearing scenery image information is incident, and an exit surface having substantially the same shape as that of the exit surface of the optical element. The reflecting surface of the optical element opposes the exit surface of the prism member. The half mirror has the reflecting surface of the half mirror directed to the exit surface of the prism member.

(1-1-5) After the light beam bearing the scenery image information is incident on the incident surface of the prism member and output from the exit surface of the prism member, the light beam reaches the observer side through the reflecting surface and front surface of the optical element.

(1-1-6) The optical element and the prism member are joined to each other.

A method of manufacturing a half mirror according to the present invention is characterized as follows:

(2-1) In manufacturing a half mirror used to observe video information in the visible region which is displayed on a display means by guiding the video information to an eyeball of an observer, the method includes the steps of forming a plurality of metal films on a surface of a substrate, and forming a dielectric film. In the respective steps, the substrate is not heated.

DETAILED DESCRIPTION OF THE PREFERRED EMBODIMENTS

Figure 1:
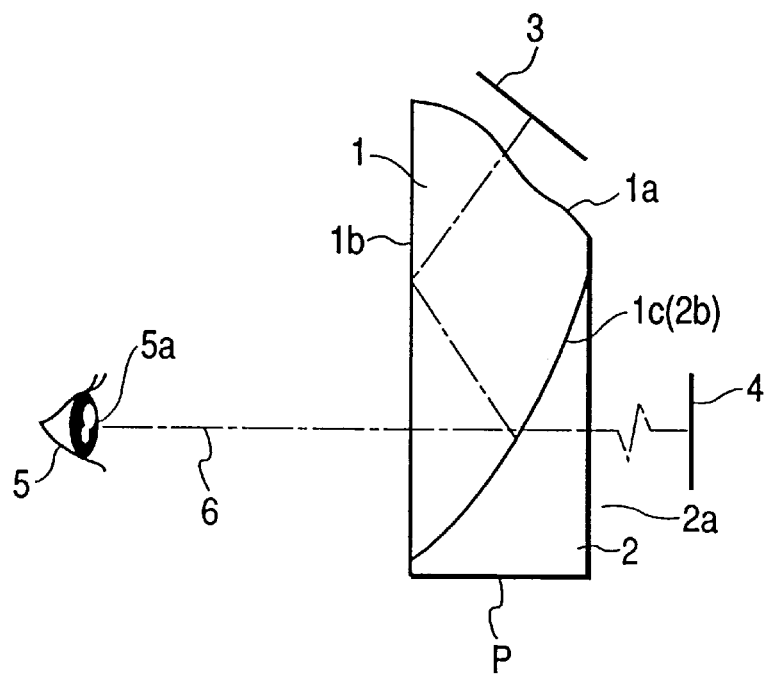
FIG. 1 is a schematic view showing the main part of an observation system having a half mirror according to the present invention.

FIG. 1 is a sectional view showing the main part of the optical path of an observation system using a half mirror according to the first embodiment of the present invention.

FIG. 1 shows an observer 5 and a display means 3 such as a liquid crystal display, which is displaying video information in the visible region. The display means 3 is displaying video information on the basis of a signal from a video information supply means (not shown) such as a CD-ROM or video camera.

An observation optical system P includes a magnifying optical element 1 made of a prism member and a see-through prism member 2 bonded to the optical element 1. The optical element 1 is comprised of an incident surface 1a which is a flat or spherical surface, a front surface 1b which is a flat, spherical, or toric aspherical surface and partly uses total reflection, and a reflecting surface 1c which is a flat, spherical, or toric surface.

The prism member 2 includes an incident surface 2a which is a flat, spherical, or toric surface and receives a light beam bearing scenery image information and an exit surface 2b which is a flat, spherical, or toric surface having the same shape as that of the reflecting surface 1c of the optical element 1.

The reflecting surface 1c of the optical element 1 or the exit surface 2b of the prism member 2 serves as a half mirror surface. In this embodiment, the reflecting surface 1c is used as a half mirror surface. The half mirror surface is made up of a plurality of metal films and a plurality of dielectric films formed on the surface of the substrate. FIG. 1 also shows a scenery image information 4 and an optical axis (central axis) 6. The optical axis 6 coincides with the optical axis of an eyeball 5a. A virtual image of the video information displayed on the display means 3 is observed through the respective elements inserted on the optical path extending from the display means 3 to the eyeball 5a.

The optical element 1 and the prism member 2 are integrally molded with a plastic resin material such as acrylic resin, polycarbonate resin, or polyolefine. In this embodiment, a light beam (visible light beam) bearing the video information displayed on the display means 3 is sent into the optical element 1 through the incident surface 1a. The light beam is totally reflected by the front surface 1b of the optical element 1, and is reflected/focused by the reflecting surface 1c to pass through the front surface 1b. As a result, the light beam reaches the eyeball 5a of the observer 5.

In addition, the scenery image information 4 is observed through the incident surface 2a and exit surface 2b of the prism member 2 and the reflecting surface 1c and front surface 1b of the optical element 1. In this case, the curvature of the incident surface 2a of the prism member 2 is appropriately set to spatially superimpose the scenery image information 4 and the virtual image of the video information from the display means 3 so as to allow observation of both of them within the same visual field with the same diopter.

Although the reflecting surface 1c of the optical element 1 is used as a half mirror surface, the reflecting surface 1c may serve as a light-transmitting surface and the exit surface 2b of the prism member 2 may serve as a half mirror surface.

In this embodiment, the half mirror is made up of a plurality of metal films and a plurality of dielectric films formed on the surface of the substrate. The plurality of metal films are made of chromium and silver. In this case, the thickness of each chromium film falls within the range of 0.1 to 10 nm. The chromium film of each metal film made up of two layers, i.e., chromium and silver layers, servers to increase the bonding force (adhesion) of the silver film with respect to the substrate or a dielectric film formed on the substrate and help form a silver film without any defects, thereby obtaining a half mirror having excellent optical characteristics.

A material for each dielectric film is selected from SiO, $SiO_2$, $MgF_2$, $Al_2O_3$, $ZrO_2$, $TiO_2$, $Ta_2O_5$, ZnS, and mixtures of them.

The manufacturing process for this half mirror includes the step of forming a plurality of metal films on the surface of the substrate and the step of forming a plurality of dielectric films. The substrate is not heated in each step.

Figure 2:
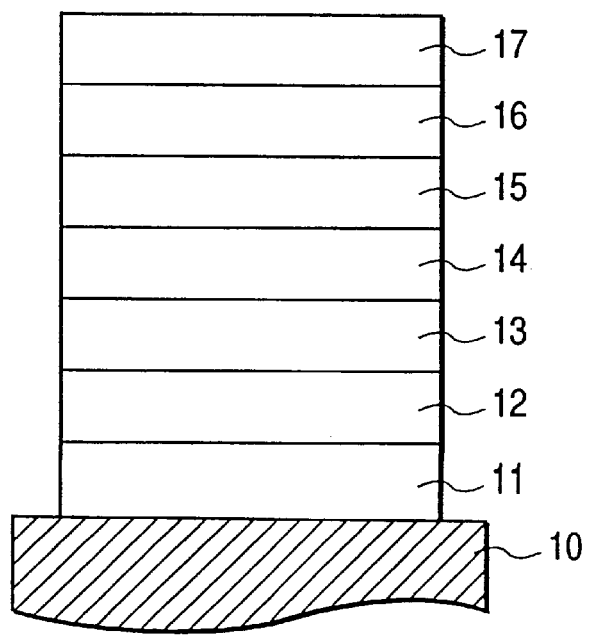
FIG. 2 is a schematic sectional view showing the film configuration of the half mirror according to the present invention.

FIG. 2 is a schematic sectional view showing the film configuration of the half mirror surface 1c (2b) in FIG. 1. The film configuration of the half mirror surface in this embodiment is comprised of the following seven films (layers) sequentially formed on the upper surface of a base member 10 consisting of acrylic resin (plastic): two dielectric films, an $SiO_2$ film 11 and a $ZrO_2$ film 12; two metal films, a Cr film 13 and an Ag film 14; and three dielectric films, an $Al_2O_3$ film 15, a $ZrO_2$ film 16, and an $SiO_2$ film 17.

Other configurations of the respective films and their characteristics in this embodiment will be described next.

As the first layer 11, an SiO or $SiO_2$ film as a silicon oxide film can be used, which exhibits good adhesion characteristics with respect to the plastic base member 10 and can reduce deformation caused by thermal expansion or hygroscopic expansion.

The second layer 12 is a film mainly consisting of $ZrO_2$ or $TiO_2$ having a high refractive index and a small absorption. The thickness of this film is controlled to selectively reduce internal reflection on the Ag film so as to flatten the spectral distribution.

The Cr film as the third layer 13 serves to improve the adhesion characteristics of the Ag film on the upper layer (fourth layer) so as to reduce defects of the Ag film. The thickness of this film preferably falls within the range of 0.1 to 10 nm. At a film thickness of 0.1 nm or less, the effect of this film is small. With an increase in film thickness, the absorption unique to Cr increases. In this embodiment, therefore, film thickness control is exercised with very high precision by using both an optical film thickness meter and a quartz film thickness meter.

By controlling the thickness of the Ag film as the fourth layer 14, the split ratio between the amount of reflected light and the amount of transmitted light can be easily changed. The thickness of this film serving as a half mirror falls within the range of 10 nm to 40 nm.

The $Al_2O_3$ film as the fifth layer 15 exhibits strong adhesion with an Ag film and is so dense in film quality to suppress entrance of moisture in the air or the like. The thickness of the sixth layer 16 mainly consisting of $ZrO_2$ is controlled to flatten the spectral distribution. The $SiO_2$ film as the seventh layer 17 has a high film strength and serves to improve the solvent resistance.

Note that all the above films are continuously formed by vacuum deposition without heating the substrate, and hence can be unloaded from the vacuum chamber immediately after they are formed. That is, in this embodiment, no standby time for heating and cooling is required. Therefore, the manufacturing cycle is short, and the manufacturing process is very simple.

Methods of manufacturing the film configuration of half mirror surfaces according to this embodiment will be described next.

EXAMPLE 1

A prism-like base member consisting of acrylic resin was loaded into a vacuum deposition apparatus, and the apparatus was evacuated to a pressure of $1 \times 10^{-3}$ Pa or less without heating the base member. Thereafter, the following films were sequentially formed: a 160-nm thick SiO film as the first layer, an 80-nm thick $ZrO_2$ film as the second layer, which mainly consisted of $ZrO_2$, a 2-nm thick Cr film as the third layer, a 32-nm thick Ag film as the fourth layer, a 20-nm thick $Al_2O_3$ film as the fifth layer, a 70-nm thick $ZrO_2$ film as the sixth layer, which was made of a mixture mainly consisting of $ZrO_2$, and a 10-nm thick SiO film as the seventh layer. The resultant structure was unloaded from the vacuum deposition apparatus. This structure was joined to a see-through prism member 2, thus manufacturing an observation system half mirror with the ratio between reflectance and transmittance being set to 8:2.

Figure 3:
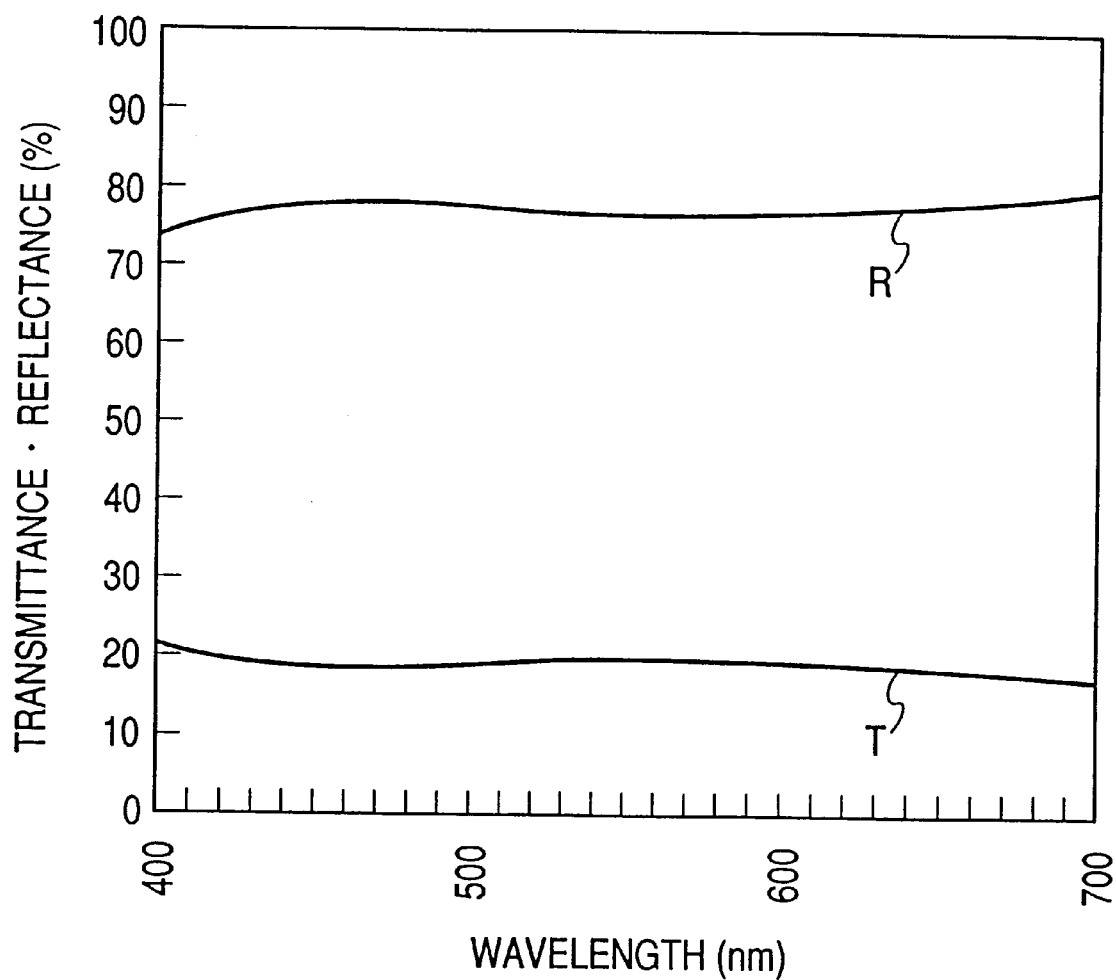
FIG. 3 is a graph for explaining the spectral distribution of the half mirror according to the present invention.

FIG. 3 is a graph showing a spectral reflectance R and a spectral transmittance T of internal reflection on the half mirror upon incidence of light at an incident angle of 25°. As is obvious from this graph, in this embodiment, a flat spectral distribution is obtained between wavelengths of 400 to 660 nm in the visible region, and at a wavelength of 500 nm, a reflectance of 77.7%, a transmittance of 19.4%, and an absorption of 2.9% are attained. That is, a half mirror having excellent optical characteristics with a small absorption can be realized.

EXAMPLE 2

A prism-like base member consisting of acrylic resin was loaded into a vacuum deposition apparatus, and the apparatus was evacuated to a pressure of $1\times10^{-3}$ Pa or less without heating the base member. Then, the following films were sequentially formed: a 160-nm thick SiO film as the first layer, an 80-nm thick $ZrO_2$ film as the second layer, which mainly consisted of $ZrO_2$, a 2-nm thick Cr film as the third layer, a 26-nm thick Ag film as the fourth layer, a 20-nm thick $Al_2O_3$ film as the fifth layer, a 70-nm thick $ZrO_2$ film as the sixth layer, which was made of a mixture mainly consisting of $ZrO_2$, and a 10-nm thick SiO film as the seventh layer. The resultant structure was unloaded from the vacuum deposition apparatus. This structure was joined to a see-through prism member, thus manufacturing an observation system half mirror with the ratio between reflectance and transmittance being set to 7:3.

This half mirror exhibits a flat spectral distribution between wavelengths of 400 to 660 nm in the visible region of internal reflection upon incidence of light at an incident angle of 25°. In addition, at a wavelength of 500 nm, a reflectance of 68.5%, a transmittance of 18.5%, and an absorption of 3.0% are attained. That is, a half mirror having excellent optical characteristics with a small absorption can be realized.

EXAMPLE 3

A prism-like base member consisting of polycarbonate resin was loaded into a vacuum deposition apparatus, and the apparatus was evacuated to a pressure of $1\times10^{-3}$ Pa or less without heating the base member. After that, the following films were sequentially formed: a 160-nm thick SiO film as the first layer, a 2-nm thick Cr film as the second layer, a 32-nm thick Ag film as the third layer, a 2-nm thick Cr film as the fourth layer, a 150-nm thick $Al_2O_3$ film as the fifth layer, and a 10-nm thick SiO film as the sixth layer. The resultant structure was unloaded from the vacuum deposition apparatus. This structure was joined to a see-through prism member through an air gap, thus manufacturing an observation system half mirror with the ratio between reflectance and transmittance being set to 8:2.

This half mirror exhibits a flat spectral distribution between wavelengths of 400 to 660 nm in the visible region of internal reflection upon incidence of light at an incident angle of 25°. In addition, at a wavelength of 500 nm, a reflectance of 77.6%, a transmittance of 19.7%, and an absorption of 2.7% are attained. That is, a half mirror having excellent optical characteristics with a small absorption can be realized.

A half mirror having a film configuration that is not based on this embodiment was manufactured and compared with the half mirror surfaces according to the present invention.

A prism-like base member consisting of acrylic resin was loaded into a vacuum deposition apparatus, and the apparatus was evacuated to a pressure of $1\times10^{-3}$ Pa or less without heating the base member. Thereafter, the following films were sequentially formed: a 160-nm thick SiO film as the first layer, an 80-nm thick $ZrO_2$ film as the second layer, which mainly consisted of $ZrO_2$, a 32-nm thick Ag film as the third layer, a 70-nm thick $ZrO_2$ film as the fourth layer, which was made of a mixture mainly consisting of $ZrO_2$, and a 10-nm thick SiO film as the fifth layer. The resultant structure was unloaded from the vacuum deposition apparatus. This structure was joined to a see-through prism member, thus manufacturing an observation system half mirror with the ratio between reflectance and transmittance being set to 8:2.

This half mirror exhibited a flat spectral distribution between wavelengths of 400 to 650 nm in the visible region of internal reflection upon incidence of light at an incident angle of 25°. In addition, at a wavelength of 500 nm, a reflectance of 72.5%, a transmittance of 20.4%, and an absorption of 7.1% were recorded. That is, this half mirror exhibited a large absorption unlike the characteristics of an Ag film.

According to the present invention, by setting the respective factors in the above manner, an observation system having a half mirror which exhibits a flat spectral distribution in a wide visible region, has excellent optical characteristics with a small light absorption, and allows a simple manufacturing process can be realized, together with a method of manufacturing the half mirror.

What is claimed is:

1. An observation optical system comprising:
    a display unit; and
    a half mirror for guiding display information in the visible region, displayed on said display unit, to an eye of an observer,
    said half mirror having;
    a first metal film containing chromium; and
    a second metal film containing silver,
    wherein said first metal film and said second metal film are so provided as to be adjacent each other, and a thickness of said first metal falls within the range of 0.1 to 10 nm.

2. A system according to claim 1, wherein a material for said dielectric film is one member selected from the group consisting of SiO, $SiO_2$, $MgF_2$, $Al_2O_3$, $ZrO_2$, $TiO_2$, $Ta_2O_5$, ZnS, and mixtures thereof.

3. An observation optical system having a half mirror, comprising:
    a display unit;
    a half mirror for guiding display information in the visible region, displayed on said display unit, to an eye an observer;
    wherein said half mirror is made up of a plurality of metal films and a plurality of dielectric films, and wherein the display information in the visible region which is displayed on said display unit is reflected by said half mirror to reach the eye of the observer, and a scenery image beam is transmitted through said half mirror to reach the eye of the observer and said system further comprises:
    a first prism having an incident surface on which the display information in the visible region, displayed on said display unit, is incident, a reflecting surface which reflects the incident display information, the light reflected by said reflecting surface reaching said half mirror, and an exit surface from which the light reflected by said half mirror emerges, and a second prism having an incident surface on which the scenery image beam is incident, the incident beam reaching said half mirror.

4. A system according to claim 3, wherein said first and second prisms are joined to each other.

5. A half mirror in which a plurality of metal films are formed on a substrate, comprising:
    a first metal film containing chromium; and
    a second metal film containing silver,
    wherein said first metal film and said second metal film are so provided as to be adjacent each other, and a thickness of said first metal film falls within the range of 0.1 to 10 nm.

6. A half mirror according to claim 5, wherein said first metal film is disposed at the substrate side of said second metal film.

7. A half mirror according to claim 5, wherein said plurality of metal films consist of silver film or chromium film.

8. A half mirror according to claim 5 further comprising a plurality of dielectric films, wherein the film closest to the substrate is the dielectric film and the film furthest from the substrate is the dielectric film.

9. A half mirror according to claim 5 further comprising a dielectric film, wherein a material for said dielectric film is one member selected from the group consisting of SiO, $SiO_2$, $MgF_2$, $Al_2O_3$, $ZrO_2$, $TiO_2$, $Ta_2O_5$, ZnS, and mixtures thereof.

10. A half mirror according to claim 5, wherein a film made of SiO or $SiO_2$ which is a closest film to the substrate is provided.

11. A half mirror according to claim 10, wherein a film made of $SiO_2$ which is a furthest film from the substrate is provided.

12. An observation optical system including the half mirror according to claim 5.

13. An observation optical system including the half mirror according to claim 5, comprising:

a display unit;

a first prism having an incident surface on which display information in the visible region, displayed on said display unit, is incident, a reflecting surface which reflects the incident display information, the light reflected by said reflecting surface reaching said half mirror, and an exit surface from which the light reflected by said half mirror emerges; and a second prism having an incident surface on which scenery image beam is incident, the incident scenery image beam reaching said half mirror.

* * * * *